(12) United States Patent
Yule

(10) Patent No.: US 7,956,801 B2
(45) Date of Patent: Jun. 7, 2011

(54) MOBILE DEVICE COMPRISING A GPS RECEIVER

(75) Inventor: Andrew T. Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 188 days.

(21) Appl. No.: 12/307,428

(22) PCT Filed: Jul. 3, 2007

(86) PCT No.: PCT/IB2007/052571
§ 371 (c)(1),
(2), (4) Date: Jan. 5, 2009

(87) PCT Pub. No.: WO2008/004176
PCT Pub. Date: Jan. 10, 2008

(65) Prior Publication Data
US 2009/0284413 A1      Nov. 19, 2009

(30) Foreign Application Priority Data

Jul. 4, 2006   (EP) ..................................... 06116585

(51) Int. Cl.
*G01S 19/05*    (2010.01)
*G01S 19/42*    (2010.01)

(52) U.S. Cl. ............................. 342/357.42; 342/357.25
(58) Field of Classification Search ............. 342/357.25, 342/357.42, 357.46, 357.76; 701/207, 213
See application file for complete search history.

(56) References Cited

U.S. PATENT DOCUMENTS

| 5,402,347 | A | 3/1995 | McBurney et al. |
| 6,011,509 | A | 1/2000 | Dutka |
| 2002/0188403 | A1 | 12/2002 | LaMance et al. |
| 2003/0197095 | A1 | 10/2003 | Preston |
| 2006/0021021 | A1 | 1/2006 | Patel |
| 2006/0055598 | A1 | 3/2006 | Garin et al. |
| 2006/0068853 | A1 | 3/2006 | Dejanovic et al. |

FOREIGN PATENT DOCUMENTS

| WO | 02099454 A1 | 3/2002 |
| WO | 04099816 A1 | 4/2004 |

*Primary Examiner* — Dao L Phan

(57) ABSTRACT

A mobile device comprising a GPS receiver for receiving GPS signals; a communications receiver for receiving historical ephemeris data from an external server; and a processor configured to determine later ephemeris data from the historical ephemeris data and to determine a GPS position fix from the later ephemeris data. In particular, the later ephemeris data may be valid for a time period greater than any single set of the historical ephemeris data.

7 Claims, 2 Drawing Sheets

MOBILE DEVICE COMPRISING A GPS RECEIVER

This invention relates to a mobile device comprising a GPS receiver for receiving GPS signals; a communications receiver for receiving from an external server ephemeris data; and a processor configured to determine a GPS position fix.

PCT patent application, publication number WO02/099454A2 concerns a method and apparatus for generating and distributing satellite tracking information. In particular, the section entitled "Description of the Related Art" of that patent acknowledges the difficulty that a NAVSTAR GPS receiver experiences in downloading ephemeris (satellite orbit and clock data) from a GPS satellite in low signal strength conditions; and also the assisted GPS (AGPS) solution to this problem in which ephemeris data in GPS signals is received by a GPS receiver at a reference station and transmitted onwards to a remote GPS receiver which uses this ephemeris instead of that transmitted directly from GPS satellites to obtain a position fix. WO02/099454A2 indicates that since the source of AGPS ephemeris is ultimately the GPS satellites, the ephemeris remains valid for only a few hours (because of the simplified satellite orbit model described by standard NAVSTAR GPS ephemeris). As such, AGPS necessitates the remote GPS receiver connecting to a source of ephemeris information either periodically or each time a position fix is desired to ensure it is in possession of up to date ephemeris. Without up to date ephemeris, a remote GPS receiver will not be able to accurately determine its position.

The invention of WO02/099454A2 as claimed in claim 1 of that patent describes a method in which long term satellite tracking data (data for a long term ephemeris model) is generated from standard ephemeris data received at a GPS receiving station. This long term satellite tracking data is subsequently transmitted to a remote GPS receiver which may then operate for days without receiving an update of the broadcast ephemeris information. Specifically, it appears that the generation of long term satellite tracking data is done by fitting parameters for a long term ephemeris model to a recent history of standard ephemeris wherein the model not only corresponds with the ephemeris history but also future ephemeris, beyond the 2 hour period in which the standard ephemeris parameters broadcast by the GPS satellites are valid. WO02/099454A2 suggests fitting the long term ephemeris model parameters to a recent history of standard ephemeris using an iterative, least squares type approach which is computationally expensive. Furthermore, standards algorithms for obtaining GPS position fixes from standard ephemeris model parameters can not be used, rather, a more complex algorithm for obtaining a GPS position fix from long term ephemeris models is needed.

In PCT patent application, publication number WO04/099816A1, the inventors realised that satellite orbit parameters of standard ephemeris vary predictably with time to the extent that this variation can be effectively and simply modelled. Specifically, that it is possible to provide a computationally inexpensive solution to the problem of providing long term ephemeris data by providing supplemental GPS ephemeris to standard ephemeris, especially where the supplemental GPS ephemeris including parameters describing frequency components of the fluctuation over time of satellite orbit parameters of standard GPS ephemeris corresponding to lunar and solar cycles.

WO04/099816A1 further discloses the possibility of a stand-alone GPS receiver which itself is able to determine at least one parameter of the supplemental GPS ephemeris from a history of standard GPS ephemeris received directly from the GPS satellites by that GPS receiver. However, for such a receiver to have a complete ephemeris history, it must successfully acquire successive sets of ephemeris broadcast by the GPS satellites, acquiring and demodulating GPS satellite signals for at least 30 seconds to obtain a full ephemeris data message. This inherently requires substantial processing power which therefore impinges on battery life. Also, it is not certain that a GPS receiver will be able to continuously acquire GPS signals, e.g. when located in doors.

In accordance with the present invention, there is provided a mobile device comprising a GPS receiver for receiving GPS signals; a communications receiver for receiving historical ephemeris data from an external server; and a processor configured to determine later ephemeris data from the historical ephemeris data and to determine a GPS position fix from the later ephemeris data (i.e. relative to the historic ephemeris data). In particular, the later ephemeris data may be long term ephemeris data. In other words, valid for a time period greater than any single set of the historical ephemeris data.

The present invention enables a GPS receiver to utilise long term ephemeris without having to secure such long term ephemeris from an external provider as disclosed in WO02/099454A2 and without the aforementioned disadvantages of a standalone GPS receiver of the type disclosed in WO04/099816A1.

The above and other features and advantages of the present invention will be apparent from the following description, by way of example, of an embodiment of a mobile cellular telephone comprising a GPS receiver for use in a cellular telephone network with reference to the accompanying drawings in which.

Figure 1:
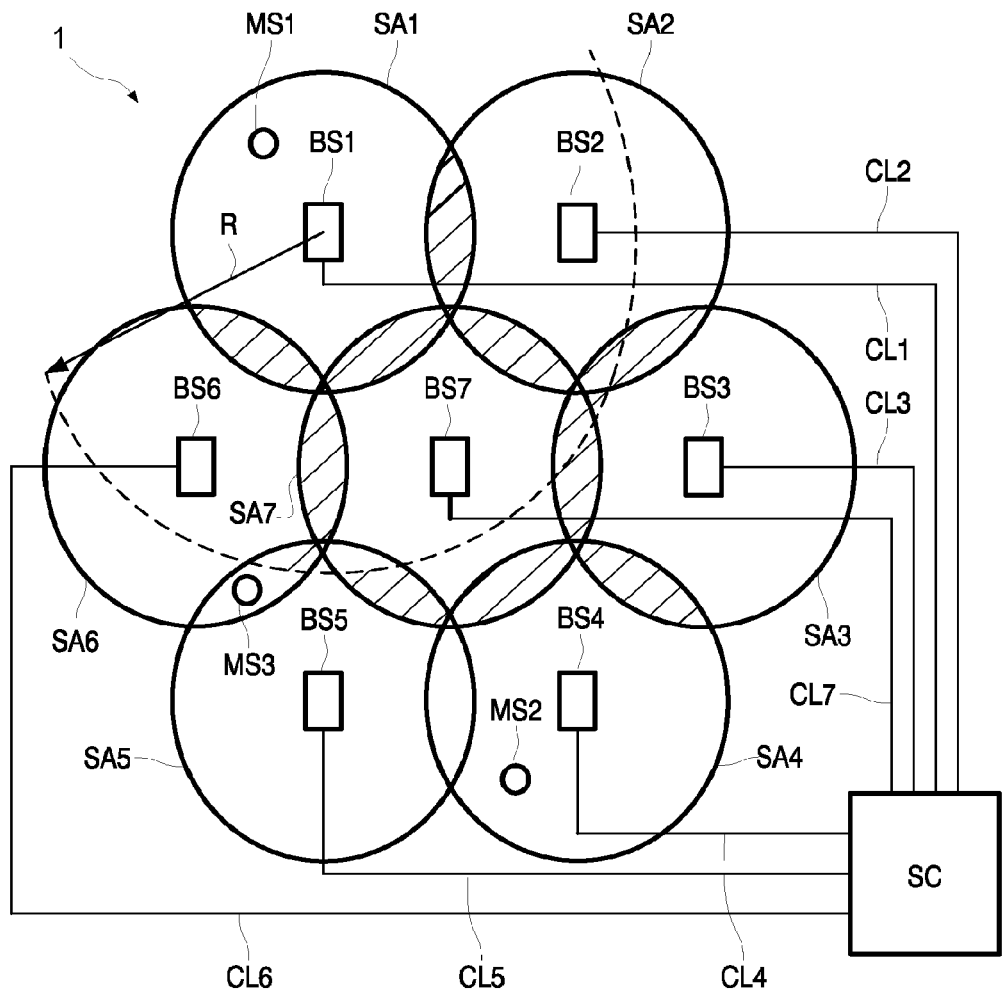
FIG. 1 shows, schematically, the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
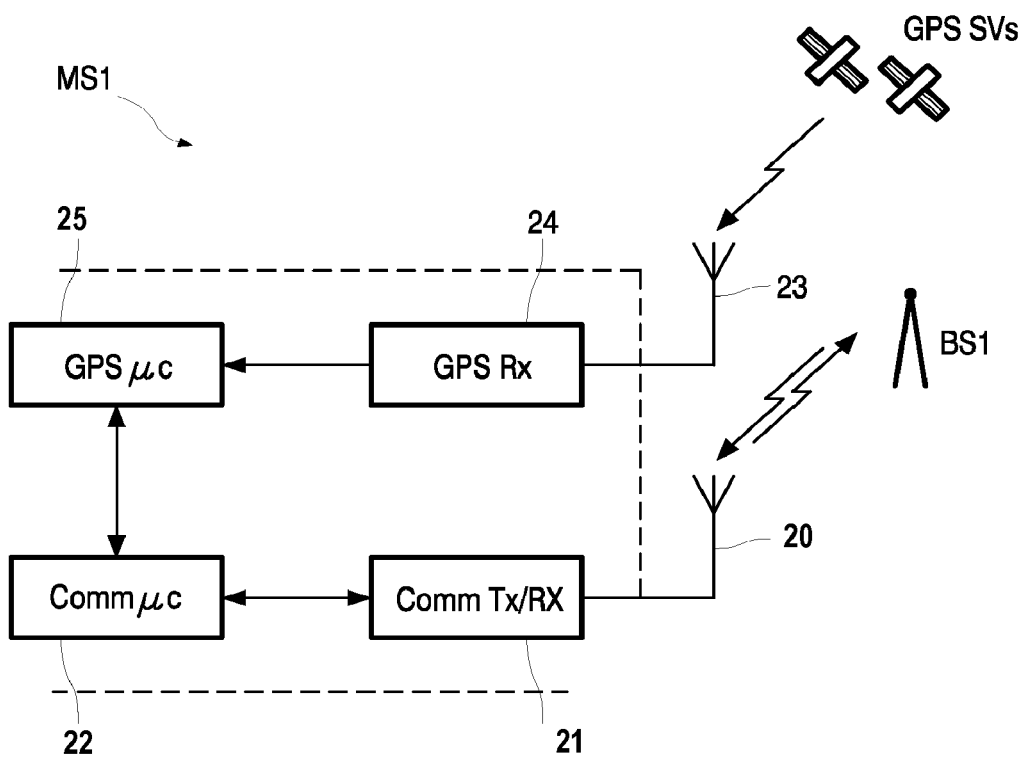
FIG. 2 shows, schematically, the mobile cellular telephone MS1 of FIG. 1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm μc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS µc) 25 receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimise out-of-band RF interference, preamplification, down conversion to an intermediate frequency (IF) and analogue to digital conversion. The resultant, digitised IF signal remains modulated, still containing all the information from the available satellites, and is fed into a memory of the GPS microprocessor 25. The GPS signals may then be acquired and tracked for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 25 may be implemented in the form a general purpose microprocessor, optionally common with the communications microprocessor 22, or a microprocessor embedded in a GPS application specific integrated circuit (ASIC).

Figure 3:
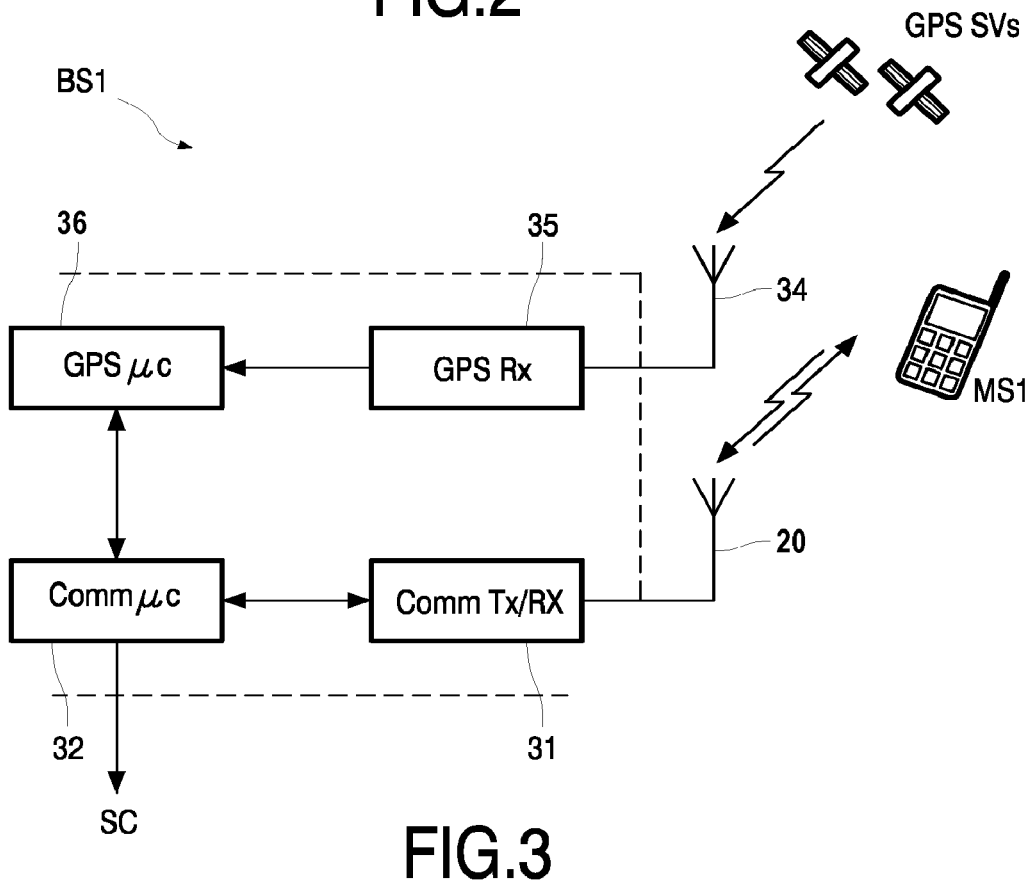
FIG. 3 shows, schematically, the base station BS1 of FIG. 1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in possession of historical ephemeris data (including the currently transmitted ephemeris data as well as previous ephemeris data).

Under the control of the system controller SC via a two-way communication link CL1, the base station BS1 can provide historical ephemeris data to mobile cellular telephone MS1. For example, the last 10 sets of ephemeris data as broadcast by the GPS satellites. Thereafter, the telephone's GPS receiver 24 is then able to determine long term ephemeris data which will enable it to sweep a narrowed range of frequencies and code phases in which the GPS PRN code is known to occupy—ensuring rapid code acquisition and time to first fix—including beyond the period in which the last received ephemeris data is valid.

Derivation of long term ephemeris data from historical ephemeris data is disclosed in WO02/099454A2 and WO04/099816A1, and therefore is not elaborated upon in any great detail in the present document. However, by way of example and with reference to WO04/099816A1, parameters describing the fluctuation of the last received ephemeris data attributable to solar and lunar cycles may be determined and the last received ephemeris data extrapolated in to the future, thereby providing long term ephemeris data. Similarly, a long term ephemeris model may be derived from historical ephemeris and utilised long after the historical ephemeris has become invalid as disclosed in WO02/099454A2.

At present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of radio transmitters at different locations and a receiver which determines its location based on the time of arrival of the transmissions of the radio transmitters.

The invention claimed is:

1. A mobile device comprising a GPS receiver for receiving GPS signals; a communications receiver for receiving historical ephemeris data from an external server; and a processor configured to determine later ephemeris data from the historical ephemeris data and to determine a GPS position fix from the later ephemeris data, wherein the later ephemeris data is valid for a time period greater than any single set of the historical ephemeris data.

2. The mobile device of claim 1, wherein the later ephemeris data is long term ephemeris data.

3. The mobile device of claim 1, wherein the GPS receiver is further configured to sweep a narrowed range of frequencies and code phases in which a GPS code is known to occupy based on the later ephemeris data.

4. The mobile device of claim 1, wherein the processor is further configured to determine the later ephemeris data by determining parameters describing a fluctuation of the historical ephemeris data attributable to solar and lunar cycles.

5. The mobile device of claim 1, wherein the GPS receiver is further configured to pre-process the GPS signals by passive bandpass filtering in order to minimise out-of-band RF interference, preamplification, down conversion to an intermediate frequency and analogue to digital conversion.

6. The mobile device of claim 1, wherein the mobile device is a mobile cellular telephone, and wherein the external server is a base station with which the mobile device is registered.

7. The mobile device of claim 1, wherein the historical ephemeris data comprises last 10 sets of ephemeris data as broadcast by GPS satellites.

\* \* \* \* \*